United States Patent
Li et al.

(10) Patent No.: US 11,879,319 B2
(45) Date of Patent: Jan. 23, 2024

(54) METHOD FOR EXPLOITING UNDERGROUND RESOURCES WITH NEGATIVE THIXOTROPIC FLUID

(71) Applicant: TONGJI UNIVERSITY, Shanghai (CN)

(72) Inventors: Bo Li, Shanghai (CN); Guansheng Han, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 18/334,699

(22) Filed: Jun. 14, 2023

(65) Prior Publication Data

US 2023/0417132 A1 Dec. 28, 2023

(30) Foreign Application Priority Data

Jun. 23, 2022 (CN) .......................... 202210717251.6

(51) Int. Cl.
*E21B 43/27* (2006.01)
*E21B 47/005* (2012.01)

(52) U.S. Cl.
CPC ............ *E21B 43/27* (2020.05); *E21B 47/005* (2020.05)

(58) Field of Classification Search
CPC ............................... E21B 43/27; E21B 47/005
See application file for complete search history.

(56) References Cited

U.S. PATENT DOCUMENTS

| 2011/0208499 A1* | 8/2011 | Verscheure ............ G01V 11/00 703/10 |
| 2017/0205531 A1* | 7/2017 | Berard .................... G01V 11/00 |
| 2018/0016895 A1* | 1/2018 | Weng ...................... E21B 43/26 |
| 2018/0284756 A1* | 10/2018 | Cella ................... B62D 15/0215 |

FOREIGN PATENT DOCUMENTS

CN 114961685 2/2023

OTHER PUBLICATIONS

Decision to Grant dated Jan. 16, 2023, issued in Chinese Application No. 202210717251.6.

* cited by examiner

*Primary Examiner* — Silvana C Runyan
(74) *Attorney, Agent, or Firm* — DLA PIPER LLP (US)

(57) ABSTRACT

Embodiments of the present disclosure relate to a method of exploiting underground resources with a negative thixotropic fluid, which induces the fault or the fracture to slip by replacing a conventional mode of injecting water with a mode of injecting the negative thixotropic fluid. According to the negative thixotropy of the injected fluid, when the fault or the fracture does not slip, viscosity of the negative thixotropic fluid is low, and the negative thixotropic fluid could flow in the fracture network. When the fault or the fracture slips, a great shear strain rate is generated, such that the viscosity of the negative thixotropic fluid is rapidly increased with the shear strain rate, to generate a great resistance force, thereby preventing the fault from further slipping.

7 Claims, 2 Drawing Sheets

METHOD FOR EXPLOITING UNDERGROUND RESOURCES WITH NEGATIVE THIXOTROPIC FLUID

CROSS REFERENCE TO RELATED APPLICATION

This patent application claims the benefit and priority of Chinese Patent Application No. 202210717251.6, filed with the China National Intellectual Property Administration on Jun. 23, 2022, the disclosure of which is incorporated by reference herein in its entirety as part of the present application.

TECHNICAL FIELD

The present disclosure relates to the technical field of underground resource exploitation, and in particular to a method for exploiting underground resources with a negative thixotropic fluid.

BACKGROUND

Underground resources mainly refer to various natural resources found below a surface, and include various metallic and non-metallic minerals, underground water, geothermal energy, etc. In the prior art, geothermal resources are exploited with engineering technologies to artificially construct a fracture network or improve an original fracture network in high-temperature reservoir. Since the constructed or improved fracture network has sufficient permeability, rock volume and fracture surface area, cold water injected from the surface will be substantially heated after flowing through the fracture network and returning to the surface. Further, the geothermal resources are exploited with a flash geothermal power generation system or a dual cycle geothermal power generation system. Similarly, oil and gas resources, especially shale gas, are exploited with a method of water injection to recycle resources or with hydraulic fracturing to increase stratum permeability, thereby improving production efficiency. However, an increasing number of studies have found an intimate correlation between injection operation and microearthquakes. When injected water seeps into a nearby fault through the stratum, a pore pressure in a fault or a fracture will be increased, and an effective stress will be reduced accordingly. After the effective stress is reduced to a certain value, a shear failure of a fault or fracture will occur, inducing an earthquake.

SUMMARY

An objective of the present disclosure is to provide a method for exploiting underground resources with a negative thixotropic fluid, so as to achieve a controllable slip of a fault or a fracture.

In order to achieve the above objective, the present disclosure provides the following solution:
  a method for exploiting underground resources with a negative thixotropic fluid includes: obtaining a stratum structure and hydrogeological data of a reservoir, and determining a fault distribution and structural features according to the stratum structure and the hydrogeological data; constructing an injection well on the basis of the fault distribution and the structural features, and forming a connected fracture network in a stratum through a hydraulic fracturing method; injecting the negative thixotropic fluid into the stratum by means of the injection well at a set injection pressure, to fill a fault and a fracture network with the negative thixotropic fluid; gradually increasing an injection pressure of the negative thixotropic fluid until the fault or fracture in the reservoir is induced to generate a slip, and stopping injection; forcing the negative thixotropic fluid that loses negative thixotropy out of the fault and the fracture network after injection of the negative thixotropic fluid is stopped; and carrying out production operation until a set production condition is reached, and returning to the step "injecting, by means of the injection well, the negative thixotropic fluid into the stratum at a set injection pressure, to fill a fault and a fracture network with the negative thixotropic fluid".

Alternatively, the method further includes: after injection of the negative thixotropic fluid is stopped, injecting a degradation material corresponding to the negative thixotropic fluid into the stratum by means of the injection well, so as to accelerate degradation of the negative thixotropic fluid and make the negative thixotropic fluid lose the negative thixotropy.

Alternatively, the negative thixotropic fluid is an oobleck fluid or a montmorillonite suspension.

Alternatively, the degradation material is biological enzymes.

Alternatively, the forcing the negative thixotropic fluid that loses negative thixotropy out of the fault and the fracture network specifically includes: injecting water into the stratum by means of the injection well, so as to force the negative thixotropic fluid that loses the negative thixotropy out of the fault and the fracture network.

Alternatively, a critical shear stress inducing the fault or the fracture in the reservoir to generate the slip is as follows:

$$\tau_c = \mu(\sigma_n - P) + \tau_0$$

where $\tau_c$ indicates the critical shear stress, $\mu$ indicates a friction coefficient, $\sigma_n$ indicates a normal stress acting on the fault or the fracture, P indicates a pressure of injected fluid, $\sigma_n - P$ indicates an effective stress, and $\tau_0$ indicates cohesion.

Alternatively, the set injection pressure is less than or equal to 2 MPa.

Alternatively, the set production condition is as follows: the fluid at a wellhead of a production well has a flow amount lower than a set value.

According to the specific embodiment of the present disclosure, the present disclosure discloses the following technical effects: the present disclosure provides the method for exploiting underground resources with a negative thixotropic fluid, which induces the fault or the fracture to slip by replacing a conventional mode of injecting water with a mode of injecting the negative thixotropic fluid. According to the negative thixotropy of the injected fluid, when the fault or the fracture does not slip, viscosity of the negative thixotropic fluid is low, and the negative thixotropic fluid could flow in the fracture network. When the fault or the fracture slips, a great shear strain rate is generated, such that the viscosity of the negative thixotropic fluid is rapidly increased with the shear strain rate, to generate a great resistance force, thereby preventing the fault from further slipping. The present disclosure achieves a controllable slip of the fault or the fracture by gradually increasing the injection pressure of the fluid and may further avoid induction of an earthquake disaster while ensuring production.

BRIEF DESCRIPTION OF THE DRAWINGS

In order to describe technical solutions of implementations of the present disclosure more clearly, accompanying drawings required for the embodiments are briefly described below. Apparently, the following accompanying drawings show merely some embodiments of the present disclosure, and therefore should not be regarded as the limitations to the scope. Those of ordinary skill in the art may further derive other relevant accompanying drawings from these accompanying drawings without creative efforts.

DETAILED DESCRIPTION OF THE EMBODIMENTS

The technical solutions in embodiments of the present disclosure are clearly and completely described below in combination with the accompanying drawings in the embodiments of the present disclosure. Apparently, the embodiments described are only some embodiments rather than all embodiments of the present disclosure. All other embodiments obtained by those of ordinary skill in the art on the basis of the embodiments of the present disclosure without making creative efforts fall within the scope of protection of the present disclosure.

An objective of the present disclosure is to provide a method for exploiting underground resources with a negative thixotropic fluid, so as to achieve a controllable slip of a fault or a fracture. The method is suitable for underground resource exploitation work which needs to make the fault or a fracture network generate slip, so as to increase stratum permeability, thereby carrying out subsequent production operation, such as exploitation work of underground resources such as geothermal resources and shale gas resources.

In order to make the above objectives, features, and advantages of the present disclosure clearer and more comprehensible, the present disclosure will be further described in detail below with reference to the accompanying drawings and the specific implementations.

A principle of the present disclosure is as follows:

A critical shear stress that induces a fault or a fracture in a reservoir to generate slip is as follows:

$$\tau_c = \mu(\sigma_n - P) + \tau_0$$

where $\tau_c$ indicates the critical shear stress, beyond which the fault or the fracture starts to slip, $\mu$ indicates a friction coefficient that is related to a stratum structure, hydrogeological data, fault distribution, structural features and properties of an injected fluid, and generally ranges from 0.6 and 1.0, $\sigma_n$ indicates a normal stress acting on the fault or the fracture, P indicates a pressure of injected fluid, $\sigma_n - P$ indicates an effective stress, and $\tau_0$ indicates cohesion and is generally small, which may be neglected in many cases.

According to the above equation, it is obtained that the effective stress $\sigma_n - P$ may be reduced by injecting water into a stratum, such that the critical shear stress is reduced, and a fault or fracture failure is easy to slip, resulting in an earthquake disaster. Since the normal stress $\sigma_n$ is difficult to control, it is necessary to reduce an injection pressure P, and enhance the friction coefficient $\mu$ or the cohesion $\tau_0$ to avoid the disaster.

Therefore, there is an important contradiction in actual production. That is, slip of the fault or the fracture may significantly increase the permeability of the stratum, thereby helping to improve production efficiency, but has a certain probability of inducing an earthquake, resulting in a major disaster. How to achieve a controllable slip becomes a key problem.

Figure 1:
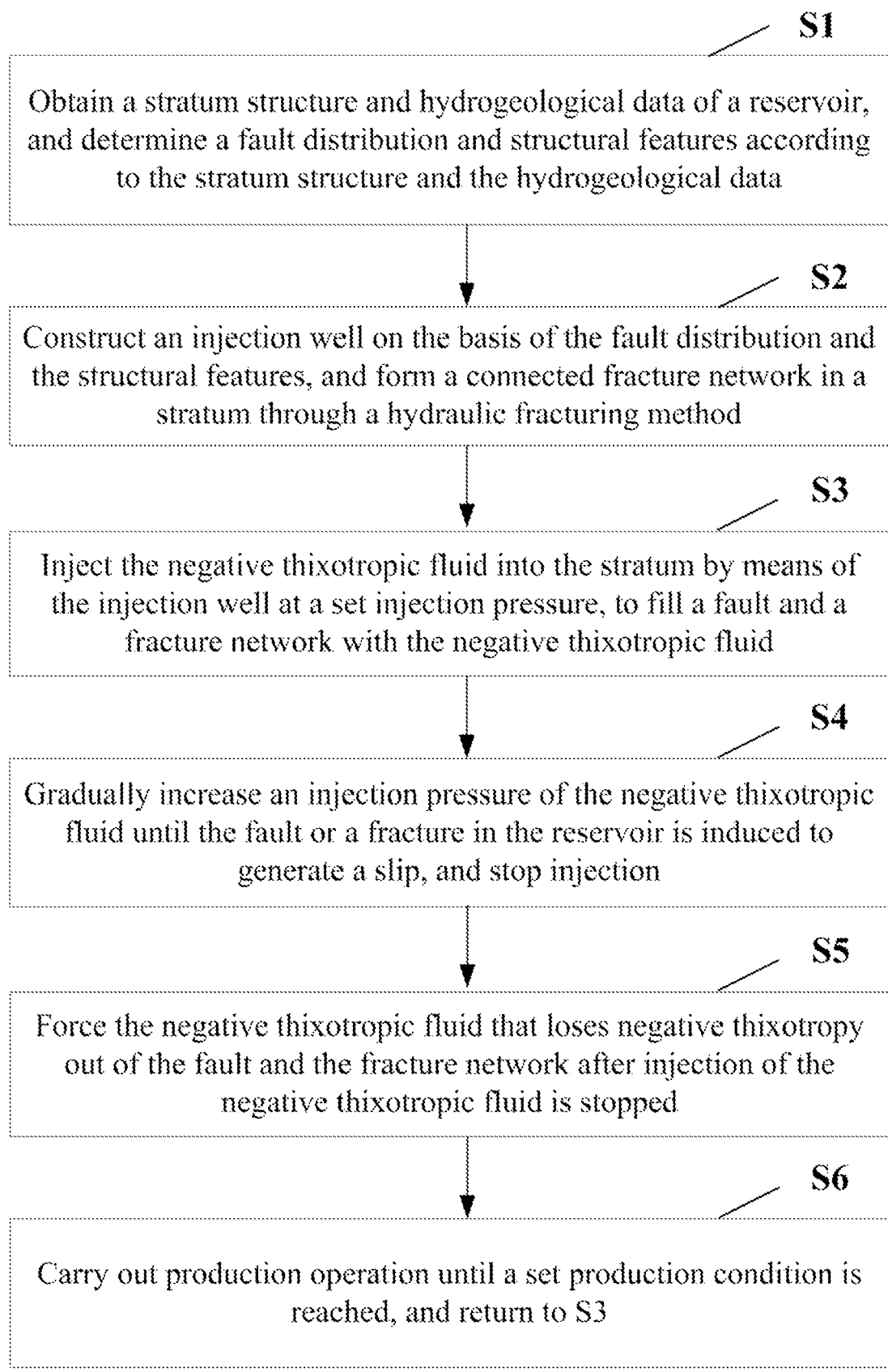
FIG. 1 is a flowchart of a method for exploiting underground resources with a negative thixotropic fluid according to the present disclosure.

FIG. 1 is a flowchart of a method for exploiting underground resources with a negative thixotropic fluid according to the present disclosure. As shown in FIG. 1, the method includes:

S1, obtain a stratum structure and hydrogeological data of a reservoir, and determine a fault distribution and structural features according to the stratum structure and the hydrogeological data.

S2, construct an injection well on the basis of the fault distribution and the structural features, and form a connected fracture network in a stratum through a hydraulic fracturing method.

Figure 2:
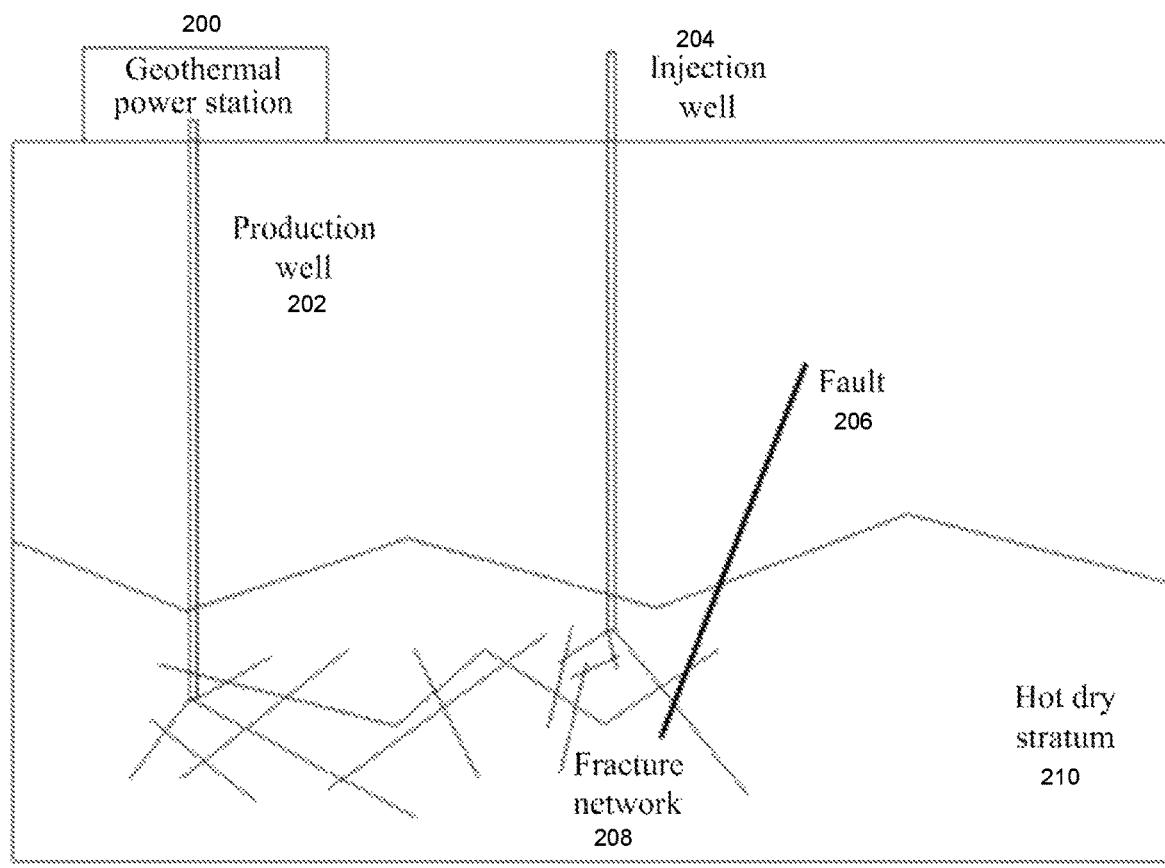
FIG. 2 is a schematic diagram of a reservoir of a method for exploiting underground resources with a negative thixotropic fluid according to the present disclosure.

The hydraulic fracturing method is a conventional technical means configured to increase stratum permeability in exploitation of underground resources such as geothermal energy and oil and gas. In the process, it can be important to control an injection pressure of a liquid (such as water) and avoid the faults, so as to prevent induction of an earthquake disaster. A specific value of the liquid injection pressure is generally determined according to an in-situ stress, a pore water pressure, tensile strength of rock, etc. in the reservoir. With exploitation of geothermal resources as an example, FIG. 2 is a schematic diagram of the method for exploiting underground resources in a reservoir with a negative thixotropic fluid according to the present disclosure. Reference can be made to FIG. 2 for specific structures and corresponding relations of a geothermal power station 200, a production well 202, an injection well 204, a fault 206, a fracture network 208 and a stratum 210 (such as hot dry rock stratum).

S3, inject the negative thixotropic fluid into the stratum by means of the injection well at a set injection pressure, to fill a fault and a fracture network with the negative thixotropic fluid.

In the process, the negative thixotropic fluid needs to be injected slowly. The set injection pressure is determined according to an in-situ stress, a pore water pressure, tensile strength of rock, etc. in the reservoir, and magnitude of the set injection pressure directly affects an injection speed and an amount of the negative thixotropic fluid. In the embodiment, the injection pressure of the negative thixotropic fluid should not exceed 2 MPa generally, and it can be important to ensure that the negative thixotropic fluid may flow slowly in the stratum under the injection pressure.

Thixotropy is a response behavior of fluid viscosity with shear strain rate. The viscosity of the negative thixotropic fluid used in the present disclosure under the action of an external shear force is increased, and then recovers after standing, which is referred as a phenomenon of negative thixotropy. The negative thixotropic fluid is injected into the stratum. When the fault or the fracture does not slip, viscosity of the fluid is low, and the fluid may flow in the fault or the fracture network. When the fault or the fracture slips, a great shear strain rate may be generated. In this case, the viscosity of the negative thixotropic fluid is also rapidly increased to generate a great resistance force, thereby preventing the fault or the fracture from further slipping. By adjusting properties and an injection amount of the negative thixotropic fluid, the controllable slip of the fault or the fracture may be achieved.

S4, gradually increase an injection pressure of the negative thixotropic fluid until the fault or a fracture in the reservoir is induced to generate a slip, and stop injection. The injected negative thixotropic fluid may be gradually degraded under the action of an underground high temperature and mechanical activation generated by the slip, thereby losing negative thixotropy.

S5, force the negative thixotropic fluid that loses negative thixotropy out of the fault and the fracture network after injection of the negative thixotropic fluid is stopped. For example, water is injected into the stratum by means of the injection well, so as to force the negative thixotropic fluid that loses the negative thixotropy out of the fault and the fracture network.

S6, carry out production operation until a set production condition is reached, and return to S3 (i.e., inject the negative thixotropic fluid into the stratum by means of the injection well at a set injection pressure, to fill a fault and a fracture network with the negative thixotropic fluid). The fluid at a wellhead of a production well has a flow amount lower than a set value. A specific fluid material and a magnitude of the set value are determined according to actual production situations. For example, when geothermal resources are exploited with a flash geothermal power generation system or a dual cycle geothermal power generation system, since cold water needs to be injected into a surface, the cold water is increased in temperature for use after flowing through the fracture network and returning to the surface. The set production condition is as follows: water at the wellhead of the production well has a flow amount (i.e. water inflow) lower than the set value (such as 10 m³/h). When the water inflow at the wellhead is too low, it indicates that the permeability of the stratum has reduced to a point in which production efficiency may not be ensured. Therefore, it is necessary to repeat steps S3 to S5 to increase the permeability of the stratum anew for exploitation of the geothermal resources.

Further, the method includes: after injection of the negative thixotropic fluid is stopped, inject a degradation material corresponding to the negative thixotropic fluid into the stratum by means of the injection well, so as to accelerate degradation of the negative thixotropic fluid and make the negative thixotropic fluid lose the negative thixotropy.

Preferably, the negative thixotropic fluid is an oobleck fluid or a montmorillonite suspension, and the degradation material is biological enzymes, which are not limited herein and may be adjusted according to actual requirements.

Compared with the prior art, the present disclosure has the following advantages:

(1) Due to characteristics of the negative thixotropic fluid, the negative thixotropic fluid may normally flow in the fracture network when injected slowly; and after the fault or the fracture begins to shear and slip, the negative thixotropic fluid exerts the characteristics, and the viscosity is rapidly increased, so as to further achieve the purpose of resisting excessive slip of the fault or the fracture.

(2) Since the viscosity of the negative thixotropic fluid is positively related to a shear rate, a sufficient resistance force is generated only after the slip begins and reaches a certain rate. Therefore, the method not only allows generation of the slip to achieve the effect of increasing permeability, but also effectively suppresses long-distance rapid slip of the fault or the fracture to avoid induction of a strong earthquake.

(3) A negative thixotropic fluid material used is harmless to an environment and may be naturally degraded.

Each embodiment of the description is described in a progressive manner, each embodiment focuses on the differences from other embodiments, and the same and similar parts between the embodiments can refer to each other.

Specific examples are used for illustration of the principles and implementation of the present disclosure herein. The descriptions of the above embodiments are merely used for assisting in understanding core ideas of the present disclosure. In addition, those of ordinary skill in the art may make various modifications in terms of the specific implementation and the scope of application in accordance with the ideas of the present disclosure. In conclusion, the content of the description should not be construed as a limitation to the present disclosure.

What is claimed is:

1. A method for exploiting underground resources with a negative thixotropic fluid, comprising:
   obtaining a stratum structure and hydrogeological data of a reservoir;
   determining a fault distribution and structural features according to the stratum structure and the hydrogeological data;
   constructing an injection well on a basis of the fault distribution and the structural features, and forming a connected fracture network in a stratum through a hydraulic fracturing method;
   injecting a negative thixotropic fluid into the stratum by the injection well at a set injection pressure, to fill a fault and a fracture network with the negative thixotropic fluid;
   increasing an injection pressure of the negative thixotropic fluid until the fault or a fracture in the reservoir is induced to generate a slip, and stopping injection;
   forcing the negative thixotropic fluid that loses negative thixotropy out of the fault and the fracture network after injection of the negative thixotropic fluid is stopped;
   carrying out production operation on a production well in the reservoir until a fluid at a wellhead of the production well has a flow amount than a set value; and
   continuing to inject the negative thixotropic fluid into the stratum by the injection well at a set injection pressure, to fill a fault and a fracture network with the negative thixotropic fluid.

2. The method for exploiting underground resources with a negative thixotropic fluid according to claim 1, wherein the negative thixotropic fluid injected into the stratum is degraded under an action of an underground high temperature and mechanical activation generated by the slip to lose the negative thixotropy, and the method further comprises:
   after injection of the negative thixotropic fluid is stopped, injecting a degradation material corresponding to the negative thixotropic fluid into the stratum by the injection well, so as to accelerate degradation of the negative thixotropic fluid and make the negative thixotropic fluid lose the negative thixotropy.

3. The method for exploiting underground resources with a negative thixotropic fluid according to claim 1, wherein the negative thixotropic fluid is an oobleck fluid or a montmorillonite suspension.

4. The method for exploiting underground resources with a negative thixotropic fluid according to claim 2, wherein the degradation material is biological enzymes.

5. The method for exploiting underground resources with a negative thixotropic fluid according to claim 1, wherein the forcing the negative thixotropic fluid that loses negative thixotropy out of the fault and the fracture network specifically comprises:

injecting water into the stratum by the injection well, so as to force the negative thixotropic fluid that loses the negative thixotropy out of the fault and the fracture network.

6. The method for exploiting underground resources with a negative thixotropic fluid according to claim 1, wherein a critical shear stress inducing the fault or the fracture in the reservoir to generate the slip is as follows:

$$\tau_c = \mu(\sigma_n - P) + \tau_0$$

wherein $\tau_c$ indicates the critical shear stress, $\mu$ indicates a friction coefficient, $\sigma_n$ indicates a normal stress acting on the fault or the fracture, P indicates a pressure of injected fluid, $\sigma_n - P$ indicates an effective stress, and $\tau_0$ indicates cohesion.

7. The method for exploiting underground resources with a negative thixotropic fluid according to claim 1, wherein the set injection pressure is less than or equal to 2 MPa.

* * * * *